Patented June 9, 1942

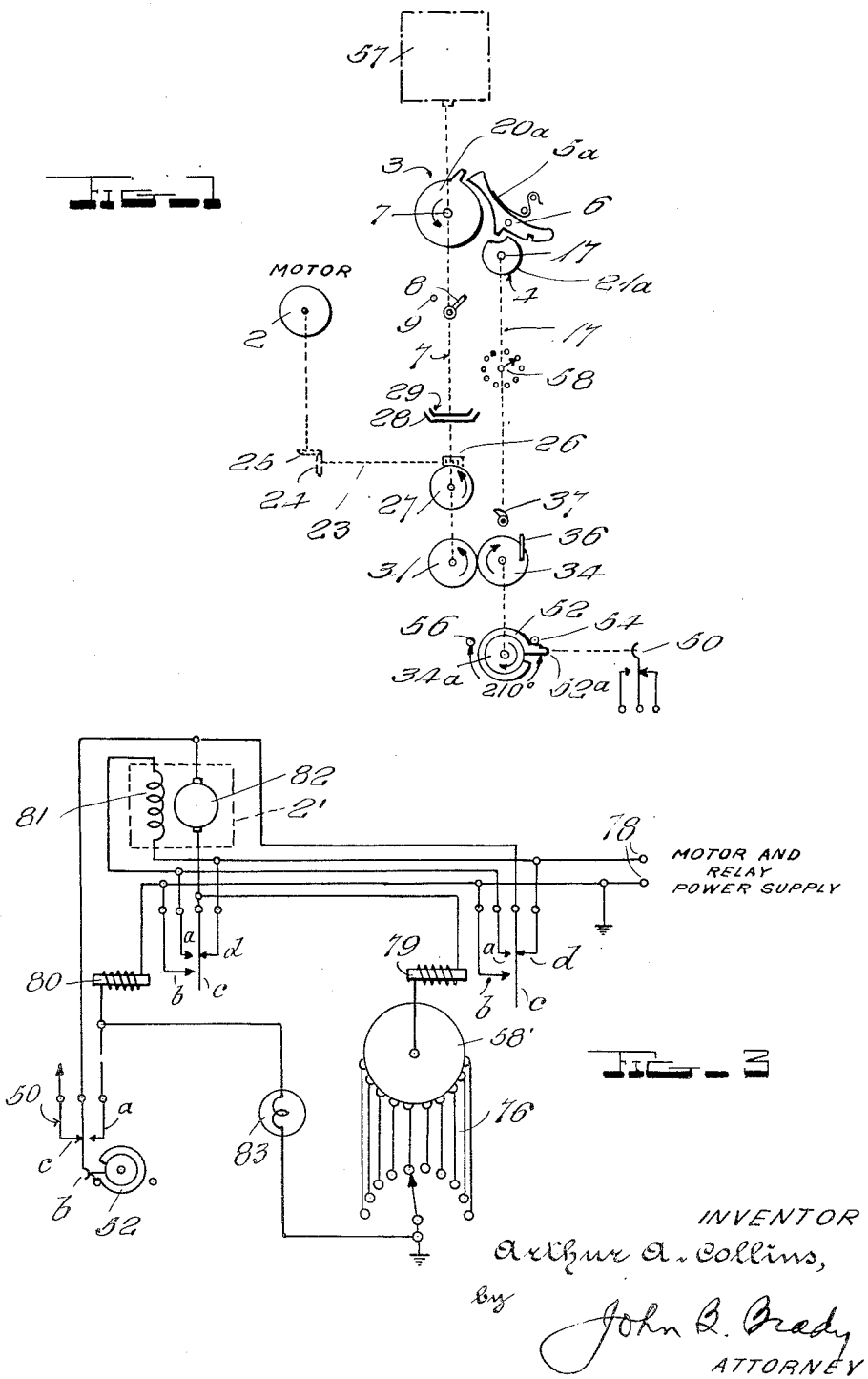

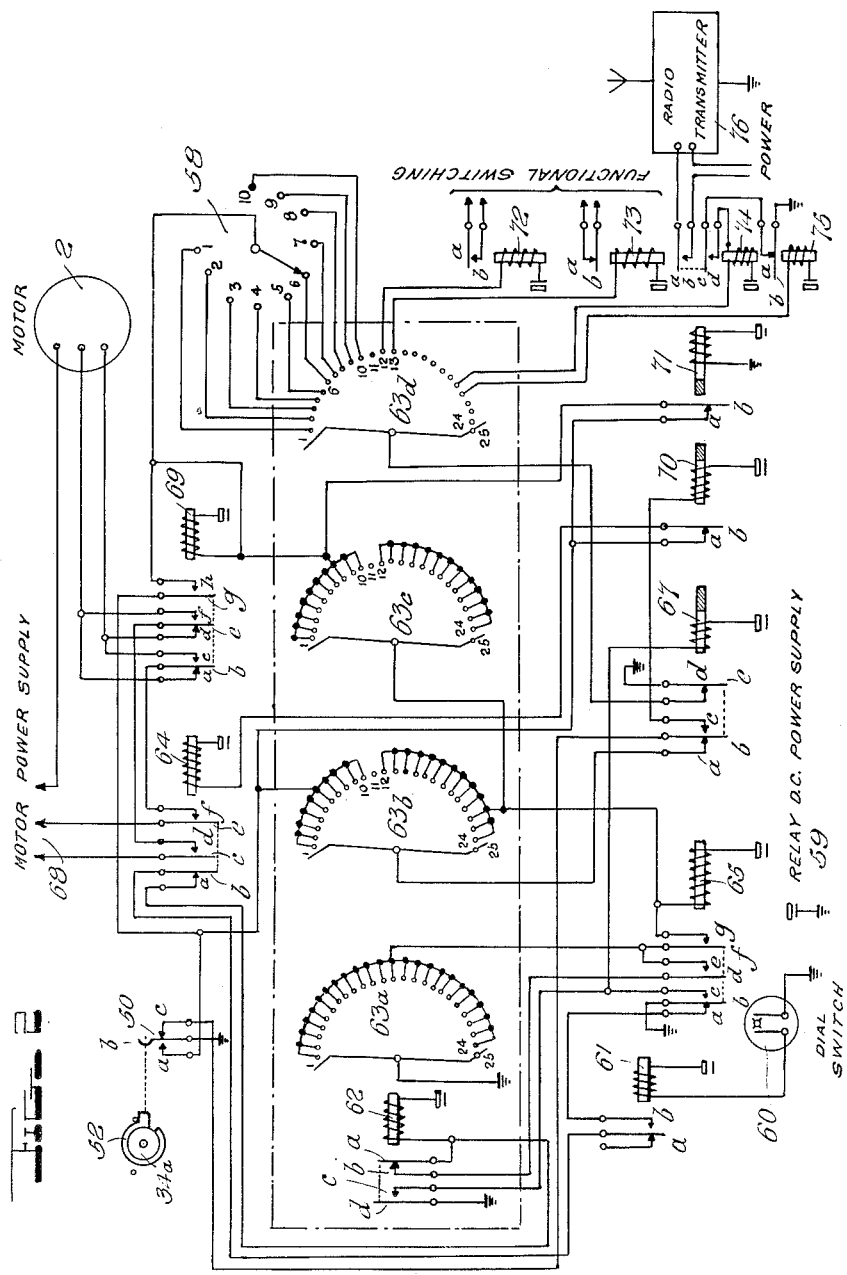

2,285,415

UNITED STATES PATENT OFFICE 2,285,415

MOTOR CONTROL SYSTEM

Arthur A. Collins, Cedar Rapids, Iowa

Original application November 8, 1939, Serial No. 303,491. Divided and this application October 16, 1940, Serial No. 361,465

7 Claims. (Cl. 172—239)

My invention relates broadly to control systems and more particularly to an electric motor control system employing motor driven switching mechanism.

This application is a division of my copending application, Serial No. 303,491, filed November 8, 1939, for Control system and apparatus. In said application, I have disclosed and claimed shaft positioning apparatus automatically operated by a controlled electric motor; the motor control system illustrated therein and disclosed and claimed in this application is intended primarily for use in connection with such shaft positioning apparatus, but may be adapted for similar purposes, as will be understood.

One of the objects of this invention, therefore, is to provide a motor control and motor driven switching system for automatic operation of shaft positioning apparatus or the like.

Another object of my invention is to provide a simplified motor control system operative through a predetermined series of steps in accordance with a number of controlling impulses for limiting the periods of forward and reverse rotation of the controlled motor.

A further object of my invention is to provide an electrical control system for shaft positioning apparatus or the like for operation by a dial type impulse switch and comprising a minimum of motor and sequence control relays.

A still further object of my invention is to provide an electrical control system for shaft positioning apparatus or the like operative from a multipoint manual selector switch.

Other and further objects of my invention reside in the apparatus and control systems hereinafter described in more detail, with reference to the accompanying drawings, in which:

Figure 1 is a diagrammatic illustration of one form of shaft positioning apparatus in connection with which the motor control system of my invention will be described for purposes of illustration; Fig. 2 is a schematic diagram of an impulse actuated electric control system constituting one form of my invention; and Fig. 3 is a schematic diagram of a modified form of motor control system employing manually actuated electrical control means.

My invention as disclosed is adapted to a radio transmitter construction having a number of tuning elements each of which has a rotatable shaft to which a shaft positioning device is connected. All the shafts are simultaneously positioned, each in any one of ten positions independently determined to tune the transmitter to ten different operating frequencies. It will be understood that the number of tuning elements may be varied, and also that the number of different predetermined settings may be more or less than the ten positions provided for in the present embodiment of my invention. The control circuits for operation of the shaft positioning devices are automatic in their functions, and may be operated by means of the dial type impulse switch in one arrangement or the manual selector switch in another arrangement.

A further feature of my invention as adapted to the control of a radio transmitter is the provision of function changing means operative from the same dial type impulse switch employed for automatic tuning. In such arrangement a conditioning operation is effected prior to the operation resulting in a change of function without in any instance affecting the set tuning of the apparatus. The function changes made in the transmitter may be the switching of the power supply "on" or "off," or the switching of the circuits of the transmitter from "CW" to "Phone" operation, and vice versa, or similar operational modifications as distinguished from change in frequency which is effected by the shaft positioning features of my invention.

Referring to the drawings in more detail, Fig. 1 illustrates a driving motor at 2 connected through bevel gears 25, 24 to shaft 23 which drives a worm 26 to rotate worm gear 27 and a slip clutch element 28 connected therewith. A shaft 7 is connected with a coacting clutch element 29 and rotates the instrument 57 which, in the embodiment described, may be a tuning element of a radio transmitter. An arm 8 connected with shaft 7 coacts with a stop 9 to define a "home" position for the shaft 7 when the motor 2 is rotated in "forward" direction. A stop ring 20a is representative of a stop ring assembly 3 comprising a plurality of stop rings adjusted to different angular positions and fixed to shaft 7. Pawl 5a is individual to stop ring 20a and representative of a plurality of coacting pawls pivoted on an axis at 6. Pawl 5a is spring actuated to a position for engaging stop ring 20a when drop cam 21a is moved to the position indicated. The cam 21a is representative of a plurality fixed on shaft 17 for coaction with the plurality of pawls, and the cams are adjusted for operation individually at selected intervals of rotation of shaft 17. Positioning of shaft 17 at any selected position, therefore, corresponds to a selective operation of one of the drop cams represented by cam 21a, and the coaction of its individual pawl to engage the corresponding stop ring, whereby shaft 7 may subsequently be moved to a predetermined set position.

The purpose of the motor control system of my invention is to position shaft 17 in selected position by operation of the motor 2 in forward direction, and thereafter to reverse the rotation of the motor for driving in a reverse direction through a definite angle before actuation of a limit switch. The positioning of shaft 7 due to engagement of stop ring 20a and pawl 5a during the reverse movement of the motor is a feature of the automatic shaft positioning system claimed in my copending application supra, and forms no part of the invention claimed herein.

For the positioning of shaft 17, a tap switch 58 is provided, its contact arm being rotated by shaft 17 and its contacts corresponding in relative position to the required position of shaft 17. The circuits connected with the taps of switch 58 are shown in Fig. 2, or in modified form in Fig. 3. The shaft 17 is driven through dog 37 by pin 36 from gear 34 which meshes with gear 31 driven by the worm gear 27.

A limit switch 50 is also provided, and actuated through a slip clutch comprising a drum member 34a (which may be a portion of gear 34), and an outer ring 52, spring tensioned to rotate with the member 34a unless prevented by engagement of an extended lug portion 52a with stop pin 54 or 56. The extended lug portion 52a coacts with limit switch 50 for actuating the switch when the lug portion 52a abuts pin 54. The slip clutch arrangement permits rotation of the motor in the forward direction beyond the position where lug 52a engages pin 56, but limits the reverse operation of the motor to a period corresponding to movement of the lug 52a from pin 56 to pin 54. The pins may thus be variously spaced, as desired, or the slip clutch means may be wholly eliminated if the attendant functions are not required. The circuits related to limit switch 50, the purpose of which is to terminate the operation of the motor 2, are shown in Fig. 2 and in modified form in Fig. 3.

Insofar as control of motor 2 for movement of shaft 17 is concerned, there are two main phases: the forward operation of the motor, wherein the shaft is moved to selected position; and the reverse operation of the motor which is terminated by operation of the limit switch. The additional features involving movement of shaft 7 are further advantages provided in the particular embodiment disclosed.

In the forward operation, motor 2 drives worm gear 27 through gears 25 and 24, shaft 23 and worm 26, in the direction indicated by the arrow. Gear 31 and clutch element 28 are simultaneously rotated. Clutch element 29 follows element 28 and drives shaft 7 counterclockwise, as indicated in Fig. 1, until stop arm 8 engages stop pin 9 with the stop-ring drum assembly 3 in "home" position. The instrument, indicated at 57, is connected with and rotated as is shaft 7. At the same time, gear 31 drives gear 34 in clockwise direction, pin 36 moving in the clear through an arc of 210° while clutch ring 52 follows the movement of gear 34 also through an arc of 210°. By this time shaft 7 is prevented from further counterclockwise movement by pin 9, and the clutch ring 52 is stopped by pin 56. Motor 2 continues to drive gears 27, 31 and 34, however, with the clutches slipping, to move pin 36 against the dog 37 to drive shaft 17 and the cam drum assembly 4. Coupled with shaft 17 is the tap switch 58, electrically connected in a control circuit as will be described and operative upon location on a selected contact to reverse the direction of rotation of motor 2. At this point, the shaft 17 and the cam drum assembly are set in accordance with the selected contact on the tap switch and one of the pawls 5a is dropped for engagement with the corresponding stop ring 20a. It will be remembered that the various cam elements 21, as described, are positioned in correlation with the spacing of the contacts on the tap switch 58, so that each contact corresponds to a pawl 5 and the selection of a contact means the operation of the corresponding pawl for engagement by the corresponding adjusted stop ring to establish the shaft 7 in a desired predetermined position.

Upon operation of switch 58 through the selected contact, motor 2 is reversed and pin 36 moves away from the dog 37, leaving switch 58, shaft 17 and the cam drum assembly 4 in selected position, and the clutch ring 52 also moves away from stop 56. The reverse movement is limited to 210° at the clutch ring 52 by engagement at that limit of the lug 52a with pin 54 and the operation of the limit switch 50 which disconnects the power supply to motor 2. During this limited reverse movement, however, clutch elements 28 and 29 again rotate together, clockwise, stop arm 8 moves away from pin 9 and the stop-ring drum assembly and the instrument 57 move to set position with stop-ring 20a engaged with the selected pawl 5a. For the remainder of the 210° range of movement, clutch elements 28, 29, slip and only gears 27, 31 and 34, with clutch ring 52 are driven at the conclusion of the cycle.

Referring to Fig. 2, the various devices illustrated schematically are of conventional form; the relays, dial and rotary switches are of types used in telephone circuits and may be arranged in compact form in a minimum of space. The source of power for the relays is shown as having one terminal grounded at 59, and the other terminal variously connected with the several relays the circuits of which are completed in accordance with the desired sequence of operations. Reference character 60 designates a dial type impulse switch capable of sending any number of impulses between one and eleven, inclusive. An impulse relay 61 is controlled by the impulse switch 60, and its contacts 61a—b operate the stepping magnet 62 of a four bank, twenty-five position rotary switch, 63a, 63b, 63c, 63d, through a circuit from the magnet 62 through normally closed contacts 64a—b of a motor starting relay 64, the contacts 61a—b of the impulse relay 61, and normally closed contacts 65a—b of a homing relay 65, to ground.

The stepping magnet 62 has back contacts 62a—b connected in an auxiliary circuit from the magnet 62 through contacts 65d—e of the homing relay 65, and the contacts of switch bank 63a to ground, for stepping the switch banks 63a—d to home position by self impulsing upon operation of relay 65. The stepping magnet also has contacts 62c—d for operating a slow release disconnect relay 67 upon the start of a cycle of operation of the system.

Motor 2 is illustrated as a three-phase motor energized from an appropriate source connected at 68 with circuits through contacts 64c—d and 64e—f of motor starting relay 64, and through contacts 69a—b—c and 69d—e—f of a motor reversing relay 69. Relay 64 is energized by the circuit from the relay through contacts 70a—b of a time delay relay 70 and the contacts 1–10 on switch bank 63b, to ground; and relay 64 has a holding circuit paralleled with the contacts of switch bank 63b at contacts 50a—b of limit switch 50 which are closed after the motor has started. Motor reversing relay 69 is energized by the circuit from the relay through the motor driven selector switch 58, switch bank 63d, and contacts 67d—e of disconnect relay 67, to ground; and relay 69 has a holding circuit through its own contacts 69g—h to ground through the limit switch 50.

Homing relay 65 is energized simultaneously with the motor reversing relay 69 by connection from the relay 65 through switch bank 63c to relay 69 and thence through the same circuit therefrom through switch 58, switch bank 63d, and contacts 67d—e to ground. Relay 65 has a holding circuit through its own contacts 65f—g and the switch bank 63a to ground, releasing when the rotary switch 63a—d has returned to home position, shown.

Disconnect relay 67 is energized by stepping magnet contacts 62c—d as described, and holds over between and after the stepping impulses by virtue of its slow release operation. Relay 67 is also operated upon the operation of homing relay 65 through contacts 65c—b thereof. Relay 67 operates to disconnect ground from the switch bank 63b through its contacts 67a—b and from switch bank 63d through its contacts 67d—e, while stepping operations take place in the rotary switch to prevent false operation of interconnected circuits.

Time delay relay 70 is energized through contacts 67c—b of the disconnect relay 67, and is a slow release relay the contacts of which are interposed in the circuit of the motor starting relay 64 to prevent false operation of the relay 64 and motor 2 when the rotary switch is impulsed to the same position for which the circuits are already conditioned, that is, where switch 58 affords a circuit for the reversing relay 69 and the homing relay 65, and the momentary pause introduced by relay 70 allows relay 65 to operate and the system to return to rest without motor 2 having been energized.

An additional circuit for motor reversing relay 69 is provided for in contacts 71a—b of a slow operating relay 71 connected directly across the power supply. The circuit is from relay 69 through contacts 71a—b and through contacts 50a—b of the limit switch 50 to ground. The function of the relay 71 is to prevent false operation of the motor relays in case of a power interruption where, should it occur after the rotary switch 63a—d had been "homed" but before the cycle had been completed, only relay 64 would operate when power was restored and the motor would continue to run indefinitely if relay 71 were not used. No impulses can be received by magnet 62 while relay 64 is operated, contacts 64a—b being open. Relay 69 is reoperated therefore through the normally closed contacts 71a—b and establishes its holding circuit through contacts 69g—h before relay 71 operates. In the normal usage of the system, relay 71 operates while the rotary switch is stepped to the dialed position, and substantially before relays 67 and 70 are released to operate relay 64 and motor 2 to close the contacts 50a—b of the limit switch, so that its presence does not affect the normal operation of the system.

It will be noted that the shaft positioning system of ten possible selections utilizes only the contacts 1–10 inclusive of the rotary switch bank 63d. Contact 11 is open on each bank 63b, 63c, and 63d, but joined in the common connection through contacts 1–24 in the bank 63a for self-stepping the rotary switch to "homed" position, shown, contact 25 being reserved in all banks for the home position. Contacts 12–24 of bank 63b are joined for operating the homing relay 65 in this phase of the system, the circuit being from the relay through the switch bank 63b and contacts 67a—b of relay 67, and through contacts 50c—b of the limit switch 50 which is not operated in this phase of the system. Contacts 12–24 of switch bank 63c are not employed.

Contacts 12–22 of switch bank 63d, however, are available for operation of various relay circuits adaptable for auxiliary purposes such as change of function in a radio transmitter where the same impulse relay system is employed in an automatic arrangement for tuning the transmitter on a selected frequency, ten of which may be provided. In Fig. 2, I have shown relay 72 energized by the circuit through contact 63d—12 and contacts 67d—e to ground, with the contacts 72a—b adapted to close upon operation of the relay 72. A similar circuit may energize relay 73, through contact 63d—13, whereby contacts 73a—b are adapted to be opened. A similar circuit may be employed to energize relay 74, through contact 63d—20, with contacts 74a—b adapted to be closed and contacts 74c—d arranged to establish a holding circuit for relay 74 through contacts 75a—b of a separate relay 75. Relay 75 in turn may be operated by a similar circuit, through contact 63d—21 for opening contacts 75a—b and releasing relay 74. These latter two relays 74, 75, may be employed to control the application of power to and the disconnection of power from the radio transmitter 76 at the beginning and end, respectively, of periods of operation, as indicated.

For operation of the motor 2 to set the instrument shaft or shafts in a desired position by means of the dial controlled system illustrated in Fig. 2, the proper number of impulses is produced by dialing, say #6, at the switch 60. Each of the four switch banks 63a—d steps up to contact #6, and simultaneously relay 67 has been operated to open the circuits through banks 63b and 63d, and relay 70 is operated to prevent immediate operation of motor starting relay 64. When the switch banks are in established positions, relays 67 and 70 open after a momentary delay and motor starting relay 64 is operated to energize the motor 2 to drive in the forward direction, Fig. 1. The first main phase of the mechanical operations is then effected as hereinbefore described, ending with the closing of switch 58 on the selected contact, #6 in the example taken. Motor reversing relay 69 is then operated, and the second main phase of the mechanical operations is effected, as hereinbefore described.

As the motor 2 is energized and begins to turn, the movement of clutch ring 52 throws the limit switch 50 to close the holding circuits for the motor relays 64 and 69. At the time switch 58 is stopped on the selected contact, #6, and motor reversing relay 69 is operated, the homing relay 65 is also operated and the circuit to the stepping magnet is completed at the contacts 65d—e to return the rotary switch to starting or home position. Relay 67 is again operated to open the circuits through banks 63b and 63d to prevent false connections. Relays 64 and 69 remain operated while the motor continues its reverse running and release when the limit switch 50 is operated at the conclusion of the second main phase of the mechanical sequence, whereupon the circuits are in condition for the next cycle of operation.

Where it is desired to operate one of the auxiliary relays 72—75 or the circuits connected to any of the contacts in the switch bank 63d between #12 and #22, inclusive, a first dialing operation is performed to produce eleven impulses to set the switch banks on the open contacts #11 in the banks 63b, 63c and 63d. Relays 67 and 70 operate as before during this function and the motor relay circuits are not affected. Then the impulses required for the desired operation are produced at switch 60, say nine, which will step the rotary switches up to contacts #20. Relays 67 and 70 subsequently release, homing relay 65 being operated through switch bank 63b, contacts 67a—b of relay 67, and contacts 50c—b of limit switch 50, whereupon the rotary switch steps up to starting or home position. Release or relay 70 is uneventful, as the circuit to the motor starting relay 64 is open at the switch bank 63b; the circuit to the motor reversing relay 69 is open at the switch bank 63c, the contacts #12—24 of which are isolated from the contacts #1—10. The circuit to relay 74 is completed through contact 63d—20 and contacts 67d—e of relay 67, before the self-stepping action at switch bank 63a returns the rotary switch to home position.

The schematic diagram of Fig. 3 illustrates the simplified circuit for automatic operation of the shaft positioning system under control of a manual selector switch 76. This arrangement is preferable in certain applications, as in aircraft radio apparatus, where weight and bulk are pertinent factors. The motor 2' in Fig. 3 is a direct current motor connected with the same source of power which supplies the relays with energy, through terminals 78. The limit switch 50 is essentially the same as that employed in the system of Fig. 2. A motor starting relay 79 and a motor reversing relay 80 together with a modified motor driven selector switch 58' complete the system elements.

The motor 2' comprises a field winding 81 and an armature 82. The field winding is connected directly to one terminal 78 at one end, and through contacts 79a—b or contacts 80a—b to the other terminal at the opposite end, depending upon which relay 79 or 80, is operative. The armature 82 has its terminals connected with relay tongues 79c and 80c through which the armature may be connected with terminals 78 for forward or reverse operation depending upon which relay, 79 or 80, is operative. Relay 79 is normally connected at one terminal through contacts 80c—d with the power source and at the other terminal through the motor driven selector switch 58' and the manual selector switch 76 to ground, which completes the circuit. The motor driven selector switch 58' is formed to contact all but one of a series of coacting contacts which are connected with the contacts of the manual selector switch 76.

When switch 76 is placed on a contact other than that for which the apparatus has previously been operated, the relay 79 is energized by the circuit through both switches 76 and 58' and motor 2' operates in the forward direction of Fig. 1 to effect the first main phase of the mechanical operation, ending with switch 58' breaking the circuit at the contact corresponding to the selected contact in the manual selector switch 76. Relay 79 is thus deenergized, which closes contacts 79c—d and not only connects the motor armature 82 to the opposite terminal of the source but also completes a circuit through relay 80 from the other terminal of the source, a circuit which has been conditioned by the closing of contacts 50a—b at the limit switch when motor 2' began to run. Operation of relay 80 completes the motor circuit for reverse operation through contacts 80a—b—c, and the second main phase of the mechanical cycle of operation is effected as described in connection with Fig. 1, at the conclusion of which limit switch 50 is opened and relay 80 is deenergized with the system in starting condition. A pilot lamp 83 is provided in shunt with the relay 80 for indicating its energization; the lamp 83 is disconnected with relay 80 by limit switch 50 and thus indicates the termination of the setting operation so that the controlled apparatus may then be utilized.

When the system of Fig. 3 is employed for tuning a radio transmitter, as disclosed, the opposite contact 50c of the limit switch 50 may be employed in a circuit including means operative to eliminate radio frequency carrier current from the antenna during the tuning operation.

While I have described my invention in certain preferred embodiments I desire it understood that modifications may be made both in the apparatus and the control circuits therefor within the scope of my invention, and that no limitations upon my invention are intended except as are imposed by the appended claims.

What I claim as new and desire to secure by Letters Patent of the United States is as follows:

1. An electric control system comprising selector switch means, a reversible electric motor, a continuously rotatable tap switch adjustable by rotation in one direction only, means for driving said tap switch by said motor in the forward driving direction thereof, means for operating said motor in the forward driving direction, means including a connection with a specific contact in said selector switch means and said tap switch for reversing said motor and leaving said tap switch in adjusted position, and a limit switch connected with the last said means and actuated by said motor in the reverse driving direction thereof for permitting a predetermined functional rotation of said motor in the reverse driving direction and terminating the operation of said motor at the conclusion thereof.

2. An electric control system comprising an impulse producing dial switch, a rotary switch controlled by the operation of said dial switch and including a plurality of independent banks of switch contacts, a reversible electric motor, a motor starting relay and a motor reversing relay having contacts connected in circuit with said motor, a tap switch driven by said motor in the forward driving direction thereof, means for operating said motor starting relay including connections through a first of said banks of switch contacts, means for operating said motor reversing relay including connections through a specific contact in a second of said banks of switch contacts and said tap switch, and a limit switch for terminating the operation of said motor actuated by said motor in the reverse driving direction thereof.

3. An electric control system as set forth in claim 2 and including self operated holding circuits for said motor starting relay and said motor reversing relay, with said limit switch connected in common to said holding circuits for deenergizing both said relays upon being actuated by said motor.

4. An electric control system as set forth in claim 2 with said rotary switch having an operating magnet and relay contacts actuated by said magnet under the control of said dial switch, and relay means controlled by said relay contacts and operative to open the circuits to said first and second banks of switch contacts.

5. An electric control system as set forth in claim 2 with said rotary switch having an operating magnet and relay contacts actuated by said magnet under the control of said dial switch, relay means controlled by said relay contacts and operative to open the circuits to said first and second banks of switch contacts, and slow release relay means controlled by the aforesaid relay means and having normally closed contacts connected in circuit with said motor starting relay, said slow release relay being operative to delay the operation of said motor starting relay momentarily after the completion of the operation of said rotary switch and the release of the aforesaid relay means.

6. An electric control system as set forth in claim 2 with said rotary switch having an operating magnet, homing relay means having contacts connected through all the contacts in a third of said banks of switch contacts and through said magnet, means for operating said homing relay means including connections through a fourth of said banks of switch contacts, said tap switch and said specific contact in the said second of said banks of switch contacts, and self operated holding circuits for said motor starting relay and said motor reversing relay.

7. An electric control system as set forth in claim 2 and including self operated holding circuits for said motor starting relay and said motor reversing relay, with said limit switch connected in common to said holding circuits for deenergizing both said relays upon being actuated by said motor, and slow acting relay means energized continuously during the operation of said system and having normally closed contacts connected in circuit with said motor reversing relay and said limit switch for operating said motor reversing relay upon the reapplication of power following an interruption therein during the operation of said motor, to restore the system to operable condition.

ARTHUR A. COLLINS.